(12) United States Patent
Yao et al.

(10) Patent No.: US 12,108,119 B2
(45) Date of Patent: Oct. 1, 2024

(54) BULLET-SCREEN COMMENT PROCESSING

(71) Applicant: SHANGHAI BILIBILI TECHNOLOGY CO., LTD., Shanghai (CN)

(72) Inventors: Bei Haoyu Yao, Shanghai (CN); Zhenyu Su, Shanghai (CN); Yun Zhang, Shanghai (CN); Xiaohu Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/160,189

(22) Filed: Jan. 26, 2023

(65) Prior Publication Data
US 2023/0247262 A1    Aug. 3, 2023

(30) Foreign Application Priority Data

Jan. 30, 2022 (CN) .......................... 202210114576.5

(51) Int. Cl.
| H04N 21/4788 | (2011.01) |
| H04N 5/265 | (2006.01) |
| H04N 21/2743 | (2011.01) |
| H04N 21/431 | (2011.01) |

(52) U.S. Cl.
CPC ......... *H04N 21/4788* (2013.01); *H04N 5/265* (2013.01); *H04N 21/2743* (2013.01); *H04N 21/4312* (2013.01)

(58) Field of Classification Search
CPC ............... H04N 21/4788; H04N 5/265; H04N 21/2743; H04N 21/4312; H04N 21/4316; H04N 21/4882; H04N 21/435; H04N 21/8126; H04N 21/8133; G09G 5/377; G09G 2320/0626; G09G 2340/0407; G09G 2340/125; G06F 9/451; G06T 11/00
See application file for complete search history.

(56) References Cited

U.S. PATENT DOCUMENTS

2018/0255346 A1* 9/2018 Guo .................. H04N 21/4858

\* cited by examiner

Primary Examiner — Alazar Tilahun
(74) Attorney, Agent, or Firm — FisherBroyles, LLP

(57) ABSTRACT

A bullet-screen comment processing method and apparatus are provided. The bullet-screen comment processing method includes: obtaining a to-be-displayed bullet-screen comment of a target video; determining preset bullet-screen comment tracks of a video playing interface based on a playing mode of the target video on the video playing interface, where the preset bullet-screen comment tracks are generated based on at least two playing modes; and rendering the to-be-displayed bullet-screen comment to the video playing interface based on the preset bullet-screen comment tracks and a bullet-screen comment display effect.

20 Claims, 6 Drawing Sheets

BULLET-SCREEN COMMENT PROCESSING

CROSS-REFERENCE TO RELATED APPLICATIONS

This application claims priority to Chinese Patent Application No. 202210114576.5, filed on Jan. 30, 2022, the contents of which are hereby incorporated by reference in their entirety for all purposes.

TECHNICAL FIELD

Some embodiments of the present application relate to the field of computer technologies, and in particular, to a bullet-screen comment processing method. One or more embodiments of the present application also relate to a bullet-screen comment processing apparatus, a computing device, and a computer-readable storage medium.

BACKGROUND

With vigorous development of multimedia technology, bullet-screen comments have been increasingly noted by users. From a website video to the cinema broadcast and large-scale events, bullet-screen comments have become one of important standards to measure whether a platform has the vitality of the times.

Bullet-screen comments mean comments floating in a video player, and the comments are formed by commenting by users during viewing of a video. Therefore, it can also be said that the phenomenon of bullet-screen comment communication is a typical case of group communication.

SUMMARY

In view of the problems, some embodiments of the present application provide a bullet-screen comment processing method. One or more embodiments of the present application also relate to a bullet-screen comment processing apparatus, a computing device, and a computer-readable storage medium, to solve the technical defect in the prior art that bullet-screen comment display in a default bullet-screen comment display mode of a system cannot meet requirements of different users.

According to a first aspect of some embodiments of the present application, a bullet-screen comment processing method is provided, where the method includes:
 obtaining a to-be-displayed bullet-screen comment of a target video:
 determining preset bullet-screen comment tracks of a video playing interface based on a playing mode of the target video on the video playing interface, where the preset bullet-screen comment tracks are generated based on at least two playing modes; and
 rendering the to-be-displayed bullet-screen comment to the video playing interface based on the preset bullet-screen comment tracks and a bullet-screen comment display effect.

According to a second aspect of some embodiments of the present application, a computing device is provided, where the computing device includes:
 a memory and a processor, where
 the memory is configured to store computer-executable instructions, the processor is configured to execute the computer-executable instructions, and when the processor executes the computer-executable instructions, the steps of the bullet-screen comment processing method are implemented.

According to a third aspect of some embodiments of the present application, a computer-readable storage medium is provided, where the computer-readable storage medium stores computer-executable instructions, and when the instructions are executed by a processor, the steps of the bullet-screen comment processing method are implemented.

Some embodiments of the present application implements a bullet-screen comment processing method and apparatus. The bullet-screen comment processing method includes: obtaining a to-be-displayed bullet-screen comment of a target video; determining preset bullet-screen comment tracks of a video playing interface based on a playing mode of the target video on the video playing interface, where the preset bullet-screen comment tracks are generated based on at least two playing modes; and rendering the to-be-displayed bullet-screen comment to the video playing interface based on the preset bullet-screen comment tracks and a bullet-screen comment display effect.

According to the embodiment of the present application, the preset bullet-screen comment tracks suitable for the video playing mode are determined based on the playing mode, and the to-be-displayed bullet-screen comment is displayed on the preset bullet-screen comment tracks based on a bullet-screen comment display effect. In a specific activity scenario, a bullet-screen comment display mode and the display effect increase an activity atmosphere and a user interaction rate, and can meet bullet-screen comment display requirements or bullet-screen comment viewing requirements of different users, thereby improving user experience in video viewing.

DESCRIPTION OF EMBODIMENTS

In the following description, numerous specific details are set forth to provide a full understanding of the present application. However, the present application can be implemented in many other modes different from those described herein, and a person skilled in the art can make similar promotion without departing from the connotation of the present application. Therefore, the present application is not limited by specific implementations disclosed below.

Terms used in one or more embodiments of the present application are merely for the purpose of describing a specific embodiment(s), and are not intended to limit the one or more embodiments of the present application. Singular forms "one", "the" and "this" used in one or more embodiments of the present application and the appended claims are also intended to include most forms unless another meaning is clearly indicated in a context. It should also be understood that, the term "and/or" used in one or more embodiments of the present application means and includes any one or all of possible combinations of one or more associated listed items.

It should be understood that although the terms "first", "second", etc. may be used in one or more embodiments of the present application to describe various information, the information should not be limited to these terms. These terms are only used to distinguish a same type of information from each other. For example, without departing from the scope of one or more embodiments of the present application, "first" may also be referred to as "second", and similarly, "second" may also be referred to as "first". Depending on the context, the word "if" as used herein may be interpreted as "when" or "in response to determining".

The terms involved in one or more embodiments of the present application are first explained.

Bullet-screen comment: A comment caption that pops up during video viewing on a network.

Currently, during playing of a video, a server may obtain bullet-screen comment information published by each user about the video, and then add the bullet-screen comment information to different time periods of the video, while a video playing terminal may display, in a default mode of displaying bullet-screen comments, the bullet-screen comments for users during video playing. However, because different users have different requirements for bullet-screen comment playing effects, the default bullet-screen comment display mode of a system cannot meet the requirements of different users. Therefore, an effective method is urgently needed to solve such problems.

In the present application, a bullet-screen comment processing method is provided. One or more embodiments of the present application also relate to a bullet-screen comment processing apparatus, a computing device, and a computer-readable storage medium, which are described in detail in the following embodiments.

Figure 1:
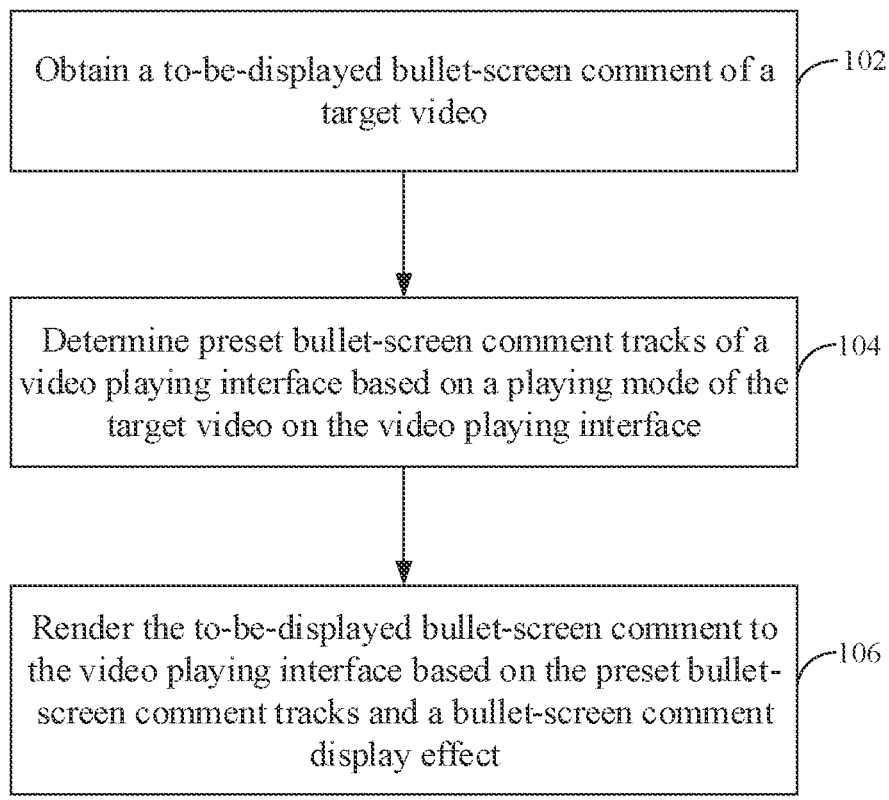
FIG. 1 is a flowchart of a bullet-screen comment processing method according to some embodiments of the present application.

FIG. 1 is a flowchart of a bullet-screen comment processing method according to some embodiments of the present application. The method includes the following steps.

Step 102: Obtain a to-be-displayed bullet-screen comment of a target video.

The bullet-screen comment processing method according to the embodiment of the present application is applied to a video playing terminal.

The target video is a video being currently played by a video playing terminal. The to-be-displayed bullet-screen comment is a bullet-screen comment submitted by a user for the target video during playing of the target video, or the to-be-displayed bullet-screen comment may be a preset bullet-screen comment corresponding to video content of the target video. The preset bullet-screen comment may be a bullet-screen comment added to the video content of the target video in advance by a service provider, such as a bullet-screen comment advertisement.

During playing of the target video for the user by using the video playing terminal, if there is a to-be-displayed bullet-screen comment in the target video, the video playing terminal may render and display the to-be-displayed bullet-screen comment in a certain bullet-screen comment display mode to achieve a target bullet-screen comment display effect. For example, during bullet-screen comment display, the to-be-displayed bullet-screen comment may be changed into a meteor shower-like style to achieve a special effect of meteor shower-like bullet-screen comments.

Step 104: Determine preset bullet-screen comment tracks of a video playing interface based on a playing mode of the target video on the video playing interface, where the preset bullet-screen comment tracks are generated based on at least two playing modes.

Specifically, the playing mode of the target video on the video playing interface includes, but is not limited to, playing in a landscape mode, playing in a portrait mode, full-screen playing, and half-screen playing. The preset bullet-screen comment tracks of the video playing interface are each a bullet-screen comment track preset for the video playing interface and used for bullet-screen comment display.

During video playing based on different playing modes, there may be differences in bullet-screen comment tracks used to display a bullet-screen comment in the video playing interface, such as positions of the bullet-screen comment tracks in the video playing interface, a quantity of the bullet-screen comment tracks, and lengths of the bullet-screen comment tracks. Therefore, after the to-be-displayed bullet-screen comment of the target video is obtained, a playing mode used by a video playing terminal to play the target video through the video playing interface may be determined, and preset bullet-screen comment tracks corresponding to this playing mode and in the video playing interface are further determined based on the playing mode, where at least two preset bullet-screen comment tracks may be provided.

In specific implementation, a process of setting preset bullet-screen comment tracks may be specifically implemented in the following mode:

determining a bullet-screen comment track design area of the video playing interface based on a preset playing mode of a to-be-played video on the video playing interface; and dividing the bullet-screen comment track design area based on a preset bullet-screen comment track interval, and determining the preset bullet-screen comment tracks of the video playing interface based on a division result.

Specifically, because the video playing interface may be used to play the to-be-displayed video in different playing modes, such as playing in a landscape mode or playing in a portrait mode, to achieve a target bullet-screen comment display effect by displaying a bullet-screen comment through preset bullet-screen comment tracks, according to the embodiment of the present application, different preset bullet-screen comment tracks may be set for the video playing interface based on different playing modes, that is, video playing on the video playing interface in different playing modes corresponds to different preset bullet-screen comment tracks.

The preset playing mode is any one or at least two of a plurality of different playing modes. The bullet-screen comment track design area is an area used to determine bullet-screen comment tracks of the video playing interface.

In practical application, different bullet-screen comment track design areas may be determined for a video playing interface for video playing based on different playing modes, the bullet-screen comment track design areas are divided into cells based on a preset bullet-screen comment track interval, and bullet-screen comment tracks of the video playing interface are determined based on a division result.

Further, the determining a bullet-screen comment track design area of the video playing interface based on a preset playing mode of a to-be-played video on the video playing interface includes:

determining corresponding interface placement results when the to-be-played video is played on the video playing interface based on preset playing modes; and determining a bullet-screen comment track design area of the video playing interface based on the interface placement results, where the bullet-screen comment track design area includes the interface placement results.

Specifically, because the video playing interface of the video playing terminal for playing a video is usually a rectangular area, during determining of a bullet-screen comment track design area of the video playing interface, a size and an interface placement direction of the video playing interface may be determined when a to-be-played video is played based on a preset playing mode, an interface placement result may be determined based on the interface placement direction and the size, and the bullet-screen comment track design area of the video playing interface may be determined based on the interface placement result, where the bullet-screen comment track design area includes the interface placement result.

Further, the bullet-screen comment track design area may be a rectangular frame; and correspondingly, the dividing the bullet-screen comment track design area based on a preset bullet-screen comment track interval, and determining the preset bullet-screen comment tracks of the video playing interface based on a division result may be specifically implemented in the following way:

dividing the bullet-screen comment track design area based on the preset bullet-screen comment track interval to generate a plurality of rectangular units; and determining a line segment generated by intersection of a target edge of a target rectangular unit and the interface placement result as a bullet-screen comment track of the video playing interface, where the target rectangular unit is one of the plurality of rectangular units, and the interface placement result includes the line segment.

Specifically, the bullet-screen comment track design area may be designed as a rectangular frame.

Figure 2A:
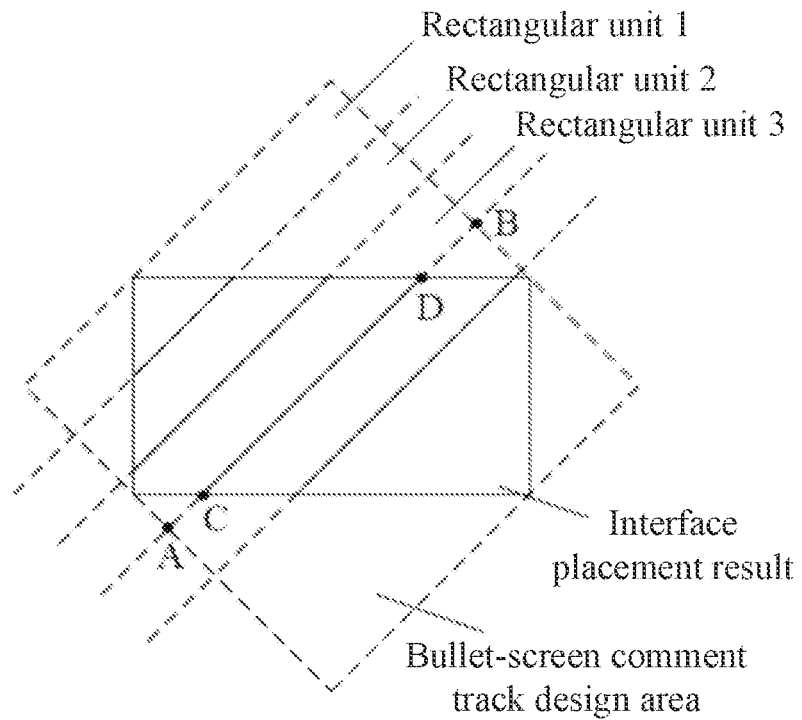
FIG. 2a is a schematic diagram of a bullet-screen comment track design result according to some embodiments of the present application.

A schematic diagram of a bullet-screen comment track design result according to some embodiments of the present application is shown in FIG. 2a. Each interface placement result in FIG. 2a is an interface placement result of a video playing interface during playing in a landscape mode, and may be specifically determined based on a size and an interface placement direction of the video playing interface during the playing in a landscape mode. The interface placement result may be determined by proportional scaling based on the size of video playing interface.

In addition, because the interface placement result is a rectangular area, a bullet-screen comment track design area may also be designed as a rectangular frame. When the bullet-screen comment track design area is a rectangular frame, to achieve a target bullet-screen comment display effect, such as a special effect of meteor shower-like bullet-screen comments, a preset bullet-screen comment track in the video playing interface may be designed to be at a certain inclination angle. Therefore, during determining of the bullet-screen comment track design area, the bullet-screen comment track design area may be set as an inclined rectangular frame, and a specific inclination angle, that is, an included angle between an upper border of the bullet-screen comment track design area and an upper border of the interface placement result, may be determined based on actual requirements, and is not limited herein.

According to the embodiment of the present application, an example in which the playing mode is playing in a landscape mode is used to describe a process of setting the preset bullet-screen comment track of the video playing interface during the playing in a landscape. A design result of a specific bullet-screen comment track design area is shown in FIG. 2a. The bullet-screen comment track design area in FIG. 2a includes interface placement results, and each side of the bullet-screen comment track design area passes through one vertex in the interface placement result, and an angle between an upper border of the bullet-screen comment track design area and an upper border of the interface placement result is 45°. However, in practical application, when the size of the bullet-screen comment track design area is greater than the size of the interface placement result, a specific shape and size may be determined based on actual requirements, and the angle between the upper border of the bullet-screen comment track design area and the upper border of the interface placement result may also be determined based on actual requirements, and is not limited herein.

After a bullet-screen comment track design area is determined, the bullet-screen comment track design area may be divided based on a preset bullet-screen comment track interval to generate a plurality of rectangular units. Two opposite sides of each rectangular unit are parallel to a length or width of the bullet-screen comment track design area, a length of each rectangular unit is equal to the length or width of the bullet-screen comment track design area, and the widths of the rectangular units are equal. A specific division result is shown in FIG. 2a. In FIG. 2a, the bullet-screen comment track design area is divided into a rectangular unit 1, a rectangular unit 2, and a rectangular unit 3.

In addition, a target rectangular unit is any one of a plurality of rectangular units. In an example in which the target rectangular unit is the rectangular unit 3, a target side of the rectangular unit 3 may be a lower border, that is, a line segment AB. Therefore, a line segment CD generated by intersection of the line segment AB of the rectangular unit 3 and the interface placement result may be determined as a preset bullet-screen comment track of the video playing interface, and an inclination angle of this preset bullet-screen comment track is 45°.

In practical application, during playing in a landscape mode, because a ratio of a video is usually 16:9, that is, a transverse side is long while a longitudinal side is short, most rectangular units intersect with a transverse side to determine preset bullet-screen comment tracks; and during playing in a portrait mode, because a ratio of a video is usually 9:16, that is, a transverse side is short while a longitudinal side is long, most rectangular units intersect with a longitudinal side to determine preset bullet-screen comment tracks. Therefore, when the quantity of preset bullet-screen comment tracks in the video playing interface is certain, the bullet-screen comment track interval may be determined based on the inclination angle of the preset bullet-screen comment tracks and a length of a transverse side or longitudinal side of the video playing interface. It can be learned that the bullet-screen comment track interval in the video playing interface during playing in a landscape mode may be the same as or different from the bullet-screen comment track interval in the video playing interface during playing in a portrait mode. This is not limited herein.

According to the embodiment of the present application, a quantity of preset bullet-screen comment tracks of the video playing interface may be specifically determined based on actual requirements, and is not limited herein.

According to the embodiment of the present application, corresponding preset bullet-screen comment tracks are set for the video playing interface for playing a video based on different playing modes respectively. In this way, the problem of rotating a screen can be solved, that is, when a playing mode is changed during video playing, bullet-screen comment display can be continued based on the preset bullet-screen comment tracks corresponding to the changed playing mode, and this processing mode improves the fluency of the bullet-screen comment display process, thereby improving video viewing experience.

Alternatively, a process of setting preset bullet-screen comment tracks may alternatively be specifically implemented in the following mode:

determining at least two corresponding interface placement results when a to-be-played video is played on the video playing interface based on at least two preset playing modes;

combining the at least two interface placement results, and determining a bullet-screen comment track design area of the video playing interface based on a combination result, where the bullet-screen comment track design area includes the combination result; and dividing the bullet-screen comment track design area based on a preset bullet-screen comment track interval, and determining the preset bullet-screen comment tracks of the video playing interface based on a division result.

Specifically, because the video playing interface may be used to play the to-be-displayed video in different playing modes, such as playing in a landscape mode or playing in a portrait mode, to achieve a target bullet-screen comment display effect by displaying a bullet-screen comment through preset bullet-screen comment tracks, and to improve the display effect that the bullet-screen comment display is connected smoothly and the bullet-screen comment track is not left blank when the video playing mode is changed during video playing, according to the embodiment of the present application, different playing modes may be combined, and different preset bullet-screen comment tracks may be set, based on a combination result, for the video playing interface for playing a video based on different playing modes.

In practical application, video playing interfaces for video playing based on different playing modes may be combined, to determine a bullet-screen comment track design area corresponding to a combination result, the bullet-screen comment track design area is divided into cells based on a preset bullet-screen comment track interval, and preset bullet-screen comment tracks of each video playing interface are determined based on a division result.

In addition, because the video playing interface of the video playing terminal for playing a video is usually a rectangular area, during determining of a bullet-screen comment track design area of the video playing interface, a size and an interface placement direction of the video playing interface may be determined when a to-be-played video is played based on different playing modes, an interface placement result may be determined based on the interface placement direction and the size, and different interface placement results are combined to determine a corresponding bullet-screen comment track design area based on a combination result, where the bullet-screen comment track design area includes the interface placement result.

Further, the bullet-screen comment track design area may be a rectangular frame; and correspondingly, the dividing the bullet-screen comment track design area based on a preset bullet-screen comment track interval, and determining the preset bullet-screen comment tracks of the video playing interface based on a division result may alternatively be implemented in the following way:

dividing the bullet-screen comment track design area based on the preset bullet-screen comment track interval to generate a plurality of rectangular units; and determining a line segment generated by intersection of a target edge of a target rectangular unit and a target interface placement result as a preset bullet-screen comment track of the video playing interface played based on a target preset video playing mode, where the target interface placement result is one of the at least two interface placement results.

Specifically, the bullet-screen comment track design area may be designed as a rectangular frame.

Figure 2B:
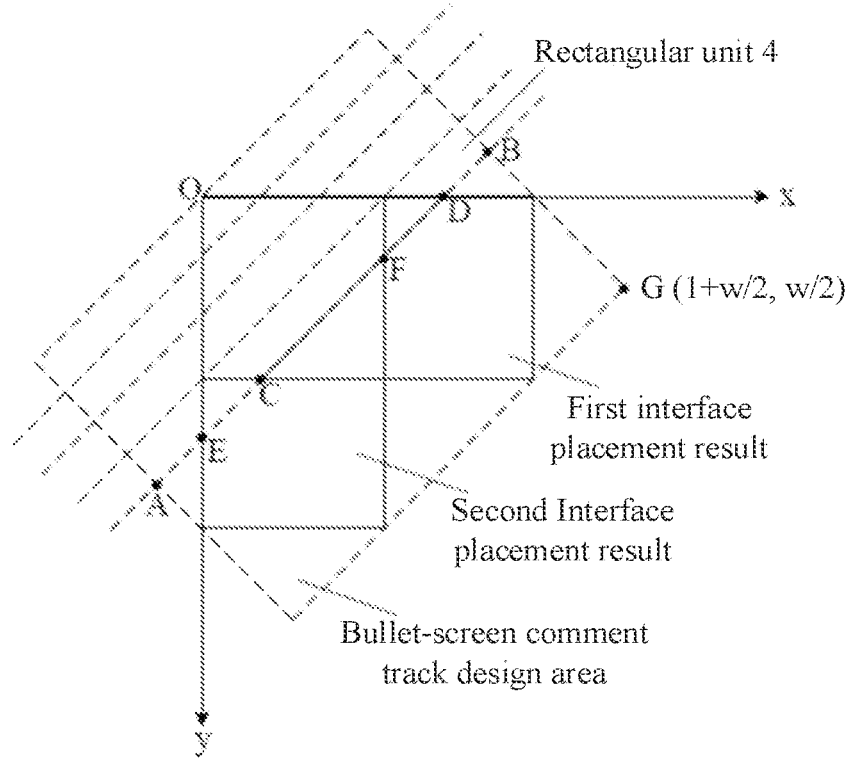
FIG. 2b is a schematic diagram of a second bullet-screen comment track design result according to some embodiments of the present application.

According to the embodiment of the present application, the two playing modes, that is, playing in a landscape mode and playing in a portrait mode are combined, and different preset bullet-screen comment tracks are set, based on a combination result, for video playing interfaces for playing videos based on different playing modes. Based on this, a schematic diagram of a second bullet-screen comment track design result according to some embodiments of the present application is shown in FIG. 2b. Interface placement results in FIG. 2b include a first interface placement result of a video playing interface during playing in a landscape mode, and a second interface placement result of a video playing interface during playing in a portrait mode. The interface placement result of the video playing interface during playing in a landscape mode may be specifically determined based on a size and an interface placement direction of the video playing interface during the playing in a landscape mode. The interface placement result of the video playing interface during playing in a portrait mode may be specifically determined based on a size and an interface placement direction of the video playing interface during playing in a portrait mode.

In addition, because the interface placement result is a rectangular area, a bullet-screen comment track design area may also be designed as a rectangular frame. When the bullet-screen comment track design area is a rectangular frame, to achieve a target bullet-screen comment display effect, such as a special effect of meteor shower-like bullet-screen comments, a preset bullet-screen comment track in the video playing interface may be designed to be at a certain inclination angle. Therefore, during determining of the bullet-screen comment track design area, the bullet-screen comment track design area may be set as an inclined rectangular frame, and a specific inclination angle, that is, an included angle between an upper border of the bullet-screen comment track design area and an upper border of any interface placement result in the combination result, may be determined based on actual requirements, and is not limited herein.

A design result of a specific bullet-screen comment track design area is shown in FIG. 2b. The bullet-screen comment track design area in FIG. 2b includes a first interface placement result and a second interface placement result, and each side of the bullet-screen comment track design area passes through one or two vertexes in the interface placement result, and an angle between an upper border of the bullet-screen comment track design area and an upper border of any interface placement result is 45°. However, in practical application, when the size of the bullet-screen comment track design area is greater than the size of the interface placement result, a specific shape and size may be determined based on actual requirements, and the angle between the upper border of the bullet-screen comment track design area and the upper border of the interface placement result may also be determined based on actual requirements, and is not limited herein.

After a bullet-screen comment track design area is determined, the bullet-screen comment track design area may be divided based on a preset bullet-screen comment track interval to generate a plurality of rectangular units. Two opposite sides of each rectangular unit are parallel to a length or width of the bullet-screen comment track design area, a length of each rectangular unit is equal to the length or width of the bullet-screen comment track design area, and the widths of the rectangular units are equal. A specific division result is shown in FIG. 2b. In FIG. 2b, the bullet-screen comment track design area is divided into a rectangular unit 1, a rectangular unit 2, a rectangular unit 3, and a rectangular unit 4. For ease of description, only the rectangular unit 4 is labeled.

In addition, a target rectangular unit is any one of a plurality of rectangular units. In an example in which the target rectangular unit is the rectangular unit 4, a target side of the rectangular unit 4 may be a lower border, that is, a line segment AB. Therefore, a line segment CD generated by intersection of the line segment AB of the rectangular unit 4 and the first interface placement result may be determined as a preset bullet-screen comment track of the video playing interface during video playing in a landscape mode, and a line segment EF generated by intersection of the line segment AB of the second interface placement result may be determined as a preset bullet-screen comment track of the video playing interface during video playing in a portrait mode.

In practical application, when preset bullet-screen comment tracks are set based on a combination result of the two playing modes, that is, playing in a landscape mode and playing in a portrait mode, a bullet-screen comment track interval in the video playing interface during playing in a landscape may be set to the same value as that during playing in a portrait mode. In this case, after a bullet-screen comment track design area is determined based on a combination result of two corresponding interface placement results during playing of a to-be-played video in the two playing modes, that is, playing in a landscape mode and playing in a portrait mode, preset bullet-screen comment tracks of the video playing interface during video playing in a landscape mode and playing in a portrait mode may be determined based on the bullet-screen comment track design area and the bullet-screen comment track interval, which improves setting efficiency of the preset bullet-screen comment tracks.

Further, the interface placement result is a rectangular frame;
correspondingly, the determining a bullet-screen comment track design area of the video playing interface based on a combination result may alternatively be implemented in the following way:
establishing a two-dimensional coordinate system with any vertex in the combination result as a coordinate origin, and with a length side and a width side of the target interface placement result as a transverse axis and a longitudinal axis respectively, where the target interface placement result is one of the at least two interface placement results; and
determining vertex coordinates of the bullet-screen comment track design area in the two-dimensional coordinate system based on a length and a width of the target interface placement result, and constructing the bullet-screen comment track design area based on the vertex coordinates.

Specifically, during video playing based on different playing modes, interface placement results of the video playing interface may all be rectangular frames. Therefore, after at least two interface placement results are combined, a two-dimensional coordinate system may be established with any vertex in the combination result as a coordinate origin, and with a length side and a width side of the target interface placement result in the at least two interface placement results as a transverse axis and a longitudinal axis respectively.

The coordinate system established in the embodiment of the present application is shown in FIG. 2b. After the first interface placement result and the second interface placement result are combined, a two-dimensional coordinate system is established with a vertex O in the combination result as a coordinate origin, a straight line with a length of the first interface placement result as an X-axis, and a straight line with a width as a Y-axis.

After the two-dimensional coordinate system is established, if the first interface placement result has a length of 1 and a width of w, coordinates of a vertex G of the bullet-screen comment track design area in the two-dimensional coordinate system may be determined as (1+w/2, w/2) based on the length and width of the first interface placement result, and then a bullet-screen comment track design area corresponding to the combination result may be constructed based on the coordinates of the vertex G. Each side of the constructed bullet-screen comment track design area passes through one or two vertices in any interface placement result.

Figure 2C:
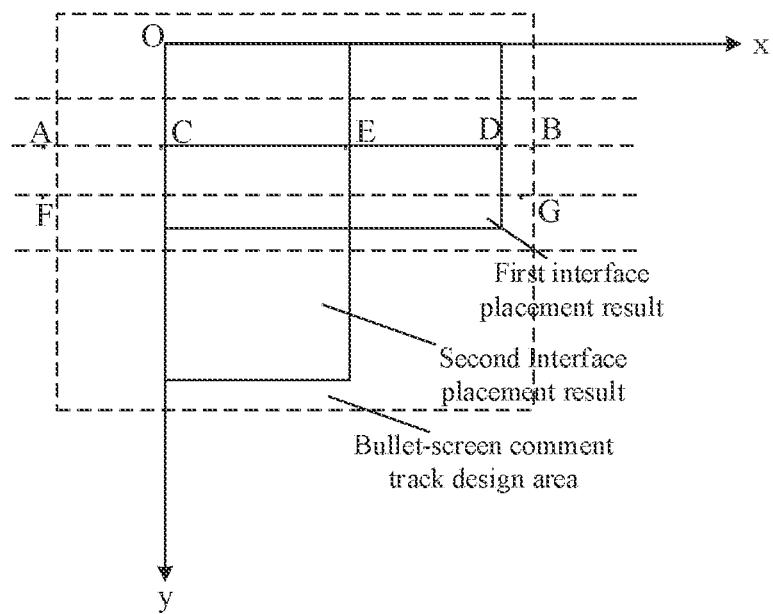
FIG. 2c is a schematic diagram of a third bullet-screen comment track design result according to some embodiments of the present application.

In addition, a schematic diagram of a third bullet-screen comment track design result according to some embodiments of the present application is shown in FIG. 2c. Interface placement results in FIG. 2c includes a first interface placement result of a video playing interface during playing in a landscape mode and a second interface placement result of a video playing interface during playing in a portrait mode.

Because each interface placement result in a rectangular area, the bullet-screen comment track design area may also be designed as a rectangular frame. When the bullet-screen comment track design area is a rectangular frame, in addition to setting preset bullet-screen comment tracks in the video playing interface to be at a certain inclination angle to achieve a certain bullet-screen comment display effect, the preset bullet-screen comment tracks may also be set to be in a horizontal or vertical direction. Therefore, when the bullet-screen comment track design area is determined, the bullet-screen comment track design area may be set as a horizontal rectangular frame. A design result of a specific bullet-screen comment track design area is shown in FIG. 2c. A specific process of setting the preset bullet-screen comment tracks in FIG. 2c is similar to that in FIG. 2b except an inclination angle. Details are not described herein again.

Figure 2D:
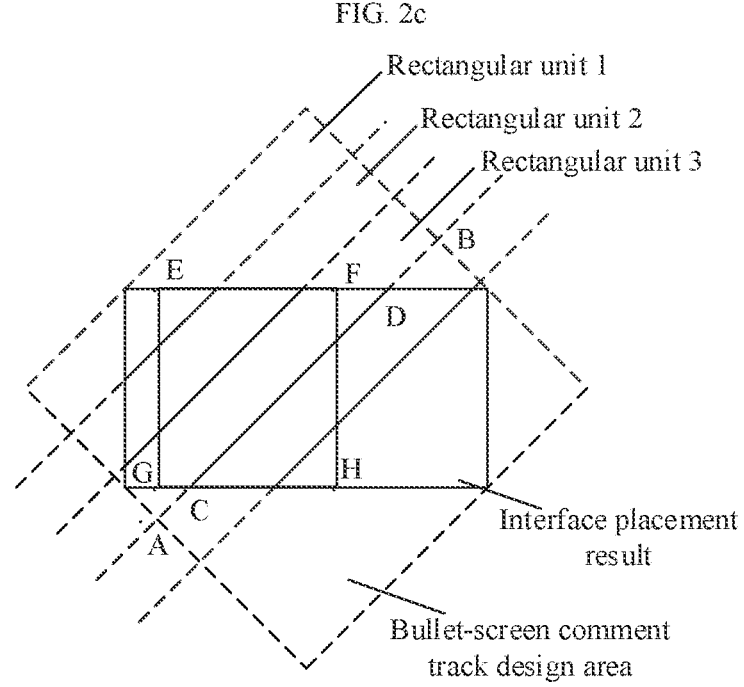
FIG. 2d is a schematic diagram of a fourth bullet-screen comment track design result according to some embodiments of the present application.

In addition, a schematic diagram of a fourth bullet-screen comment track design result according to some embodiments of the present application is shown in FIG. 2d. Interface placement results in FIG. 2d includes a first interface placement result of a video playing interface during playing in a landscape mode and a third placement result of a video playing interface during half-screen playing.

Because the interface placement result is a rectangular area, a bullet-screen comment track design area may also be designed as a rectangular frame. When the bullet-screen comment track design area is a rectangular frame, to achieve a target bullet-screen comment display effect, such as a special effect of meteor shower-like bullet-screen comments, a preset bullet-screen comment track in the video playing interface may be designed to be at a certain inclination angle. Therefore, when the bullet-screen comment track design area is determined, the bullet-screen comment track design area may be set as an inclined rectangular frame. A design result of a specific bullet-screen comment track design area is shown in FIG. 2d. A specific process of setting preset bullet-screen comment tracks in FIG. 2d is similar to that in FIG. 2b except interface placement results. Details are not described herein again.

According to the embodiment of the present application, different playing modes are combined, and different preset bullet-screen comment tracks are set, based on a combination result, for video playing interfaces for playing a video based on different playing modes. In this way, the problem of rotating a screen can be solved, that is, when a playing mode is changed during video playing, bullet-screen comment display can be continued based on the preset bullet-screen comment tracks corresponding to the changed playing mode, and this processing mode improves the fluency of the bullet-screen comment display process, thereby improving video viewing experience.

Step 106: Render the to-be-displayed bullet-screen comment to the video playing interface based on the preset bullet-screen comment tracks and a bullet-screen comment display effect.

Specifically, when the to-be-displayed bullet-screen comment needs to be displayed based on the preset bullet-screen comment display effect, after the preset bullet-screen comment tracks of the video playing interface are determined, the to-be-displayed bullet-screen comment may be rendered to the video playing interface based on the bullet-screen comment display effect and the preset bullet-screen comment tracks.

In specific implementation, the rendering the to-be-displayed bullet-screen comment to the video playing interface based on the preset bullet-screen comment tracks and a bullet-screen comment display effect includes:

determining a target bullet-screen comment track of the to-be-displayed bullet-screen comment based on the preset bullet-screen comment tracks; and rendering the to-be-displayed bullet-screen comment to the video playing interface based on the bullet-screen comment display effect and position information of the target bullet-screen comment track on the video playing interface.

Further, the determining a target bullet-screen comment track of the to-be-displayed bullet-screen comment based on the preset bullet-screen comment tracks may be specifically implemented in the following way:

determining whether idle bullet-screen comment tracks exist in the preset bullet-screen comment tracks; and if yes, determining any one of the idle bullet-screen comment tracks as the target bullet-screen comment track of the to-be-displayed bullet-screen comment; or if not, determining a target track identifier in a track queue whose adding time meets a preset time threshold, determining occupation values of preset bullet-screen comment tracks corresponding to the target track identifier, and determining a preset bullet-screen comment track whose occupation value is less than a preset occupation threshold as the target bullet-screen comment track of the to-be-displayed bullet-screen comment.

Specifically, the target bullet-screen comment track is a bullet-screen comment track used to display the to-be-displayed bullet-screen comment, and the target bullet-screen comment track is one or at least two of the preset bullet-screen comment tracks, and a specific quantity may be determined based on actual requirements, and is not limited herein.

After the preset bullet-screen comment tracks corresponding to the playing mode in the video playing interface is determined, at least one target bullet-screen comment track may be further selected from the preset bullet-screen comment tracks, to display the to-be-displayed bullet-screen comment.

In addition, the idle bullet-screen comment track is an unoccupied or unused preset bullet-screen comment track, and no to-be-displayed bullet-screen comments exist in the idle track.

Because there may be a plurality of different preset bullet-screen comment tracks in the video playing interface, and each preset bullet-screen comment track may be used for bullet-screen comment display, after the preset bullet-screen comment tracks in the video playing interface are determined, it can be determined whether idle bullet-screen comment tracks exist in the preset bullet-screen comment tracks, and if idle bullet-screen comment tracks exist in the preset bullet-screen comment tracks, one or at least two target bullet-screen comment tracks for displaying the to-be-displayed bullet-screen comment may be selected from the idle preset bullet-screen comment tracks (idle bullet-screen comment tracks); and if idle bullet-screen comment tracks do not exist in the preset bullet-screen comment tracks, it indicates that each preset bullet-screen comment track has been used for bullet-screen comment display, that is, a to-be-displayed bullet-screen comment exists in each preset bullet-screen comment track. In this case, a target bullet-screen comment track for bullet-screen comment display may be selected from a track queue. Specifically, recently used bullet-screen comment tracks may be excluded from the track queue, that is, a service time of each preset bullet-screen comment track is determined based on adding times of track identifiers in the track queue. If a time difference between the adding time and the current time is less than or equal to a preset time threshold, it can be determined that the preset bullet-screen comment track corresponding to the track identifier is a recently used bullet-screen comment track. Therefore, a track identifier in the track queue, whose adding time is greater than a preset time threshold, may be determined as a target track identifier, so as to exclude the recently used bullet-screen comment tracks, occupation values of the preset bullet-screen comment tracks corresponding to the target track identifiers are determined, that is, a ratio of a length of the bullet-screen comment displayed in each preset bullet-screen comment track to a length of the preset bullet-screen comment track is determined, and a preset bullet-screen comment track with a smaller ratio is used as a target bullet-screen comment track.

According to the embodiment of the present application, an idle track or a non-idle track with a smaller occupation value is used as the target bullet-screen comment track for bullet-screen comment display. This prevents a situation that when there are a plurality of to-be-displayed bullet-screen comments, the plurality of to-be-displayed bullet-screen comments are always displayed through one preset bullet-screen comment track, that is, the plurality of to-be-displayed bullet-screen comments may be distributed to different bullet-screen comment tracks for display, which ensures clarity of bullet-screen comment display and increases a user interaction rate, thereby improving user experience in video viewing.

Alternatively, the determining a target bullet-screen comment track of the to-be-displayed bullet-screen comment based on the preset bullet-screen comment tracks may alternatively be implemented in the following way:

determining whether idle bullet-screen comment tracks exist in the preset bullet-screen comment tracks; and if yes, selecting the target bullet-screen comment track of the to-be-displayed bullet-screen comment from the idle bullet-screen comment tracks based on a correlation between a video playing terminal and a user terminal sending the to-be-displayed bullet-screen comment.

Specifically, when a target bullet-screen comment track of a to-be-displayed bullet-screen comment is selected, a relationship between a user A who has sent a bullet-screen comment and a user B who watches the bullet-screen comment may also be determined, and the target bullet-screen comment track may be selected based on the relationship therebetween. For example, if a to-be-displayed bullet-screen comment is sent by the user A, the to-be-displayed bullet-screen comment may be displayed at a middle position of a video playing interface of the user A when displayed for the user A; and when displayed for the user B, the to-be-displayed bullet-screen comment may be displayed at any position of a video playing interface of the user B.

Therefore, during determining of a target bullet-screen comment track, it is first determined whether idle bullet-screen comment tracks exist in preset bullet-screen comment tracks; if idle bullet-screen comment tracks exist in preset bullet-screen comment tracks, a correlation between a video playing terminal and a user terminal sending the to-be-displayed bullet-screen comment is determined; if the video playing terminal and the user terminal are consistent, that is, the user A sending the to-be-displayed bullet-screen comment and the user B watching the to-be-displayed bullet-screen comment are the same user, one or at least two bullet-screen comment tracks closer to a central position of the video playing interface may be selected from the idle bullet-screen comment tracks as the target bullet-screen comment track(s). If the video playing terminal and the user terminal are inconsistent, that is, the user A who has sent the to-be-displayed bullet-screen comment and the user B who watches the to-be-displayed bullet-screen comment are not the same user, any one or at least two bullet-screen comment tracks may be selected from the idle bullet-screen comment tracks as the target bullet-screen comment track(s).

In the embodiment of the present application, the to-be-displayed bullet-screen comment is usually randomly generated on an idle bullet-screen comment track. Therefore, during determining of the target bullet-screen comment track, a hit probability of a preset bullet-screen comment track located in the middle of the video playing interface may be increased, so that a probability that the to-be-displayed bullet-screen comment is generated on the preset bullet-screen comment track in the middle of the video playing interface is increased.

According to the embodiment of the present application, the target bullet-screen comment track is selected based on the correlation between the video playing terminal and the user terminal sending the to-be-displayed bullet-screen comment, so that when it is determined based on the correlation that the user who has sent the to-be-displayed bullet-screen comment and the user who watches the to-be-displayed bullet-screen comment is the same user, the bullet-screen comment is displayed through the target bullet-screen comment track which is closer to the central position of the video playing interface, thereby increasing the user interaction rate and improving user experience in video viewing.

In addition, after the target bullet-screen comment track of the to-be-displayed bullet-screen comment is determined based on the preset bullet-screen comment tracks, a track identifier of the target bullet-screen comment track may be further determined, and the track identifier is added to the track queue, where the target bullet-screen comment track is converted into a non-idle bullet-screen comment track.

Specifically, the track queue is used to store the track identifier of the target bullet-screen comment track.

When it is determined to use the target bullet-screen comment track to display the to-be-displayed bullet-screen comment, the track identifier of the target bullet-screen comment track may be added to the track queue, to convert the target bullet-screen comment track into a non-idle bullet-screen comment track. In this case, after the target bullet-screen comment track is used to display the to-be-displayed bullet-screen comment, if there is a next to-be-displayed bullet-screen comment after the to-be-displayed bullet-screen comment, the next to-be-displayed bullet-screen comment may not be displayed through the target bullet-screen comment track, so as to prevents a situation that when there are a plurality of to-be-displayed bullet-screen comments, the plurality of to-be-displayed bullet-screen comments are always displayed through one preset bullet-screen comment track, that is, the plurality of to-be-displayed bullet-screen comments may be distributed to different bullet-screen comment tracks for display. This improves the bullet-screen comment display effect and user experience in video viewing.

In addition, it may be further determined whether a ratio of a quantity of track identifiers contained in the track queue to a quantity of preset bullet-screen comment tracks of the video playing interface is greater than a preset ratio threshold; and if yes, based on adding times of the track identifiers in the track queue, target track identifiers meeting a preset condition are filtered, and preset bullet-screen comment tracks corresponding to the target track identifiers are determined as idle bullet-screen comment tracks.

Specifically, the track queue is used to record recently used bullet-screen comment tracks, and a length of the track queue may be used to represent the quantity of track identifiers in the track queue.

In practical application, the length of the track queue may be set, for example, a maximum length of the track queue is set to 10% of a total length, where the total length is the quantity of preset bullet-screen comment tracks in the video playing interface, so as to control a quantity of occupation times of each bullet-screen comment track, and it can be ensured that there are available non-idle bullet-screen comment tracks when bullet-screen comment display is required.

Therefore, during video playing, the length of the track queue may be cyclically detected in real time or according to a certain time cycle. For example, the length of the track queue may be detected every time before the track identifier of the target bullet-screen comment track is added to the track queue, so as to determine whether the ratio of the quantity of track identifiers contained in the track queue to the quantity of preset bullet-screen comment tracks of the video playing interface is greater than a preset ratio threshold; if yes, the adding time of adding each track identifier in the track queue can be determined, then target track identifiers with earlier adding times are deleted from the track queue, and preset bullet-screen comment tracks corresponding to the target track identifier after the deletion are determined as idle bullet-screen comment tracks.

For example, if the preset ratio threshold is set to 10%, and the total quantity of preset bullet-screen comment tracks in the video playing interface is 20, the maximum length of the track queue is 2. In this case, if it is determined that the maximum length of the track queue exceeds 2, or the ratio of the quantity of track identifiers contained in the track queue to the total quantity of preset bullet-screen comment tracks in the video playing interface is greater than 10%, track identifiers added to the bullet-screen comment tracks at the earliest may be deleted from the track queue, so that the quantity of track identifiers in the track queue is always less than or equal to 2, thereby ensuring that at least 18 bullet-screen comment tracks always exist as idle tracks, that is, at least 18 bullet-screen comment tracks can always be used for bullet-screen comment display.

According to the embodiment of the present application, through the control of the quantity of track identifiers in the track queue, a situation is prevented that when there are a plurality of to-be-displayed bullet-screen comments, the plurality of to-be-displayed bullet-screen comments are always displayed through one preset bullet-screen comment track, and it is ensured that there are always available idle bullet-screen comment tracks for bullet-screen comment display, thereby ensuring clarity of bullet-screen comment display, increasing the user interaction rate, and improving user experience in video viewing.

In specific implementation, the to-be-displayed bullet-screen comment is rendered to the video playing interface based on the bullet-screen comment display effect and position information of the target bullet-screen comment track on the video playing interface. Specifically, a bullet-screen comment display style of the to-be-displayed bullet-screen comment may be determined based on the bullet-screen comment display effect, where the bullet-screen comment display style includes bullet-screen comment parameters set based on the bullet-screen comment display effect: and the to-be-displayed bullet-screen comment is rendered to the video playing interface based on the position information of the target bullet-screen comment track on the video playing interface and the bullet-screen comment display style.

Specifically, the bullet-screen comment display style includes, but is not limited to, bullet-screen comment parameters such as a size, transparency and a display speed of a bullet-screen comment, and the bullet-screen comment parameters may be set based on the bullet-screen comment display effect.

Because there may be a difference between bullet-screen comment display styles corresponding to different bullet-screen comment display effects, different bullet-screen comment display styles may be preset for different bullet-screen comment display effects. When a target bullet-screen comment display effect needs to be achieved, a bullet-screen comment display style corresponding to the target bullet-screen comment display effect may be determined, and then a to-be-displayed bullet-screen comment is rendered to a video playing interface based on position information of the target display track in the video playing interface and the bullet-screen comment display style.

The bullet-screen comment display effect may include an oblique layered display effect to achieve a special effect of meteor shower-like bullet-screen comments. In this case, four gears may be designed for the size and transparency of the bullet-screen comment, and are randomly assigned to preset bullet-screen comment tracks. A bullet-screen comment display speed or a bullet-screen comment display interval may be further set to make rapid meteors appear regularly. For example, bullet-screen comments may be displayed once every 5s, that is, meteor shower-like bullet-screen comments are displayed every 5s, to increase an activity atmosphere.

In addition, because current bullet-screen comments are mostly displayed through a bullet-screen comment layer, and a size of the bullet-screen comment layer in the embodiment of the present application may be consistent with a size of a video frame in a video playing interface, after a to-be-displayed bullet-screen comment is obtained and a target bullet-screen comment track is determined, the to-be-displayed bullet-screen comment may be rendered, based on a position of the target bullet-screen comment track in the video playing interface and a bullet-screen comment display style, to the bullet-screen comment layer for display.

In practical application, the meteor shower-like bullet-screen comment layer is above a player (including an internal control layer of the player such as volume, brightness, restore screen, and prompt for caching, but not including an external control layer of the player such as pause, full screen, and bullet-screen comment switch) and below all other layers.

In addition, during video playing, it may be further detected whether a playing mode of the target video on the video playing interface changes; and
    if yes, a preset bullet-screen comment track that is of the video playing interface during video playing based on the changed playing mode and that is included in the bullet-screen comment track design area is determined.

Specifically, because preset bullet-screen comment tracks of a video playing interface may be different during video playing based on different playing modes, if a user changes a video playing mode during the video playing, a video playing terminal needs to change bullet-screen comment tracks used to display the to-be-displayed bullet-screen comment.

Therefore, during video playing, it may be detected whether a playing mode of a target video has changed. If it is determined that the playing mode of the target video has changed, preset bullet-screen comment tracks of a video playing interface during video playing based on the changed playing mode need to be re-determined. In the process of setting the preset bullet-screen comment tracks for the video playing interface, different interface placement results corresponding to the video playing interface may be combined, and the preset bullet-screen comment tracks of the video playing interface are determined by dividing a bullet-screen comment track design area including each combination result. Therefore, when the playing mode of the target video has changed, a corresponding interface placement result when a to-be-played video is played on the video playing interface based on the changed playing mode may be re-determined, and a line segment generated by intersection of a target side of a target rectangular unit of the bullet-screen comment track design area and the interface placement result is determined as a bullet-screen comment track of the video playing interface after the playing mode is changed.

Further, it may be further determined whether idle bullet-screen comment tracks exist in the preset bullet-screen comment tracks; and when it is determined that idle tracks exist, any one of the idle bullet-screen comment tracks may be determined as a target bullet-screen comment track of the to-be-displayed bullet-screen comment for bullet-screen comment display.

In addition, when it is determined that idle tracks do not exist, an occupancy value of each preset bullet-screen comment track may also be determined, and a preset bullet-screen comment track with a smaller occupancy value is used as a target bullet-screen comment track for bullet-screen comment display.

When the preset bullet-screen comment track with a smaller occupancy value is used as the target bullet-screen comment track for bullet-screen comment display, after the bullet-screen comment display is completed, that is, after bullet-screen comment animation is finished, the track identifier of the target bullet-screen comment track may be compared with the track identifier of the current bullet-screen comment track. When the track identifiers are compared as being consistent, the occupation value of the current bullet-screen comment track may be reduced, that is, after the bullet-screen comment animation is finished, the occupation value of the target bullet-screen comment track is reduced.

According to the embodiment of the present application, when a video playing mode is changed during video playing, bullet-screen comment display can be continued based on the preset bullet-screen comment tracks corresponding to the changed playing mode, and this processing mode improves the fluency of the bullet-screen comment display process, thereby improving video viewing experience.

The bullet-screen comment processing method implemented in some embodiments of the present application includes: obtaining a to-be-displayed bullet-screen comment of a target video; determining preset bullet-screen comment tracks of a video playing interface based on a playing mode of the target video on the video playing interface, where the preset bullet-screen comment tracks are generated based on at least two playing modes; and rendering the to-be-displayed bullet-screen comment to the video playing interface based on the preset bullet-screen comment tracks and a bullet-screen comment display effect.

According to the embodiment of the present application, the preset bullet-screen comment tracks suitable for the video playing mode are determined based on the playing mode, and the to-be-displayed bullet-screen comment is displayed on the preset bullet-screen comment tracks based on a bullet-screen comment display effect. In a specific activity scenario, a bullet-screen comment display mode and the display effect increase an activity atmosphere and a user interaction rate, and can meet bullet-screen comment display requirements or bullet-screen comment viewing requirements of different users, thereby improving user experience in video viewing.

Figure 3:
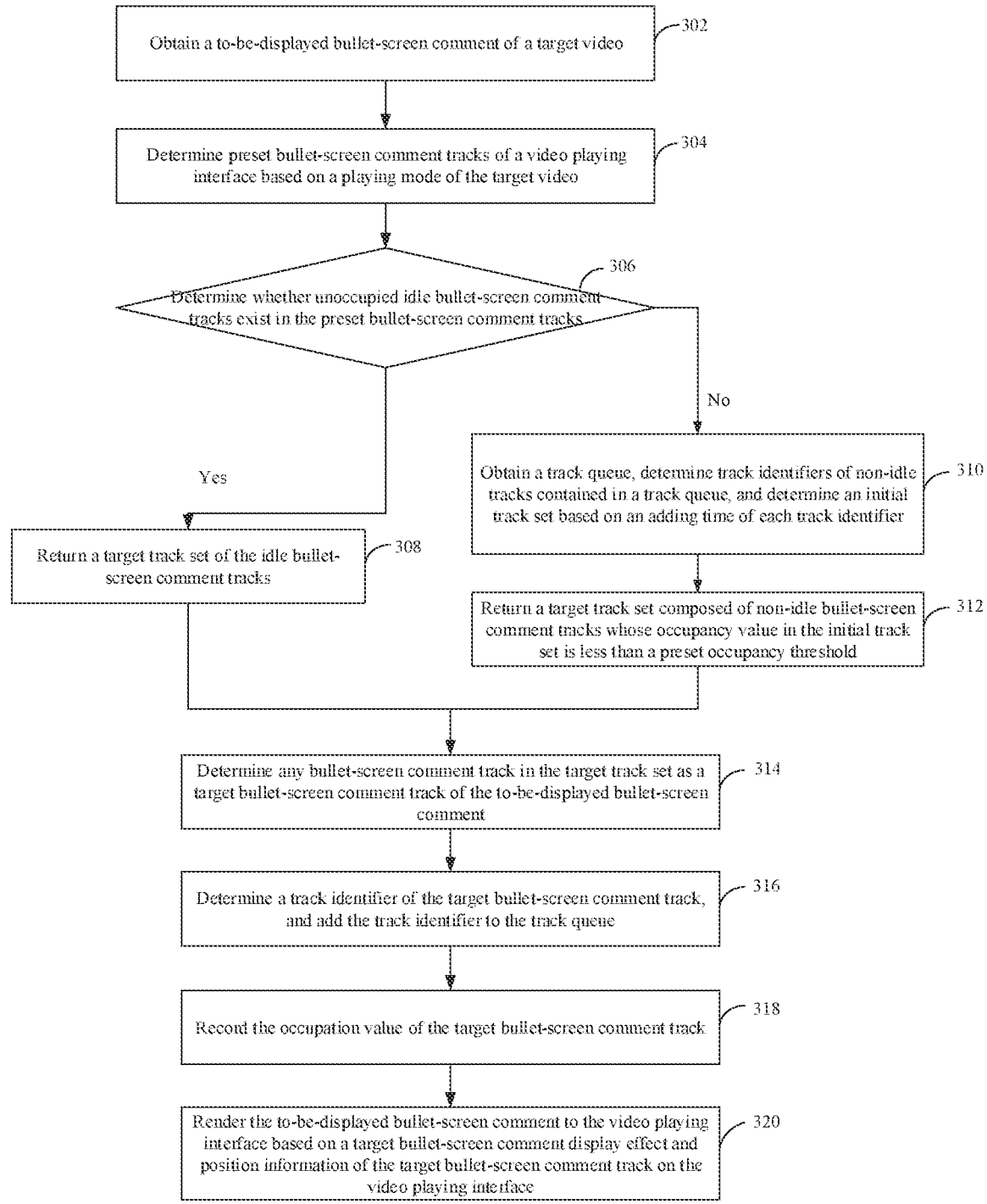
FIG. 3 is a flowchart of a processing process in which the bullet-screen comment processing method is applied to a video field according to some embodiments of the present application.

Referring to FIG. 3, an example in which the bullet-screen comment processing method is applied to a video field according to some embodiments of the present application is used to further describe the bullet-screen comment processing method. FIG. 3 is a flowchart of a processing process in which the bullet-screen comment processing method is applied to a video field according to some embodiments of the present application. The bullet-screen comment processing method specifically includes the following steps.

Step 302: Obtain a to-be-displayed bullet-screen comment of a target video.

Step 304: Determine preset bullet-screen comment tracks of a video playing interface based on a playing mode of the target video.

Step 306: Determine whether unoccupied idle bullet-screen comment tracks exist in the preset bullet-screen comment tracks.

Specifically, preset bullet-screen comment tracks outside the scope of the video playing interface may be discarded, and the remaining preset bullet-screen comment tracks may be determined.

If unoccupied idle bullet-screen comment tracks exist in the preset bullet-screen comment tracks, step 308 is performed; or else step 310 is performed.

Step 308: Return a target track set of the idle bullet-screen comment tracks.

Step 310: Obtain a track queue, determine track identifiers of non-idle tracks contained in the track queue, and determine an initial track set based on an adding time of each track identifier.

The adding time is the time when a track identifier is added to the track queue.

In addition, according to the embodiment of the present application, the occupied non-idle bullet-screen comment tracks may be further obtained, and bullet-screen comment tracks for which a time interval between a service time of the bullet-screen comment tracks and the current time is less than a preset time threshold are deleted from the non-idle bullet-screen comment tracks to generate an initial track set.

Step 312: Return a target track set composed of non-idle bullet-screen comment tracks whose occupancy value in the initial track set is less than a preset occupancy threshold.

After step 308 and step 312 are performed, step 314 may be continued.

Step 314: Determine any bullet-screen comment track in the target track set as a target bullet-screen comment track of the to-be-displayed bullet-screen comment.

Any bullet-screen comment track may be any idle bullet-screen comment track or any non-idle bullet-screen comment track.

Step 316: Determine a track identifier of the target bullet-screen comment track, and add the track identifier to a track queue, where the target bullet-screen comment track is converted into a non-idle bullet-screen comment track.

Step 318: Record the occupation value of the target bullet-screen comment track.

Step 320: Render the to-be-displayed bullet-screen comment to the video playing interface based on a target bullet-screen comment display effect and position information of the target bullet-screen comment track on the video playing interface.

According to the embodiment of the present application, the target bullet-screen comment track is selected from the preset bullet-screen comment tracks based on the video playing mode, and the to-be-displayed bullet-screen comment is displayed on the target bullet-screen comment track based on the target bullet-screen comment display effect. In a specific activity scenario, a bullet-screen comment display mode and the display effect increase an activity atmosphere and a user interaction rate, thereby improving user experience in video viewing.

Figure 4:
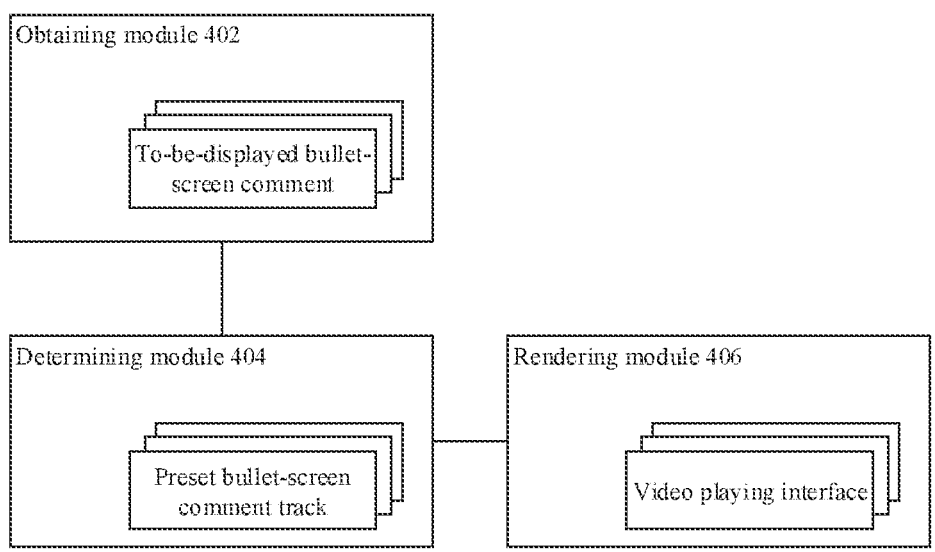
FIG. 4 is a schematic structural diagram of a bullet-screen comment processing apparatus according to some embodiments of the present application.

Corresponding to the above method embodiment, the present application further provides some embodiments of a bullet-screen comment processing apparatus. FIG. 4 is a schematic structural diagram of a bullet-screen comment processing apparatus according to some embodiments of the present application. As shown in FIG. 4, the apparatus includes:

- an obtaining module 402, configured to obtain a to-be-displayed bullet-screen comment of a target video;
- a determining module 404, configured to determine preset bullet-screen comment tracks of a video playing interface based on a playing mode of the target video on the video playing interface, where the preset bullet-screen comment tracks are generated based on at least two playing modes; and
- a rendering module 406, configured to render the to-be-displayed bullet-screen comment to the video playing interface based on the preset bullet-screen comment tracks and a bullet-screen comment display effect.

Optionally, the bullet-screen comment processing apparatus further includes:

- a first processing module, configured to determine a bullet-screen comment track design area of the video playing interface based on a preset playing mode of a to-be-played video on the video playing interface: and
- a first division module, configured to divide the bullet-screen comment track design area based on a preset bullet-screen comment track interval, and determine the preset bullet-screen comment tracks of the video playing interface based on a division result.

Optionally, the determining module 404 is further configured to:

- determine corresponding interface placement results when the to-be-played video is played on the video playing interface based on preset playing modes; and
- determine a bullet-screen comment track design area of the video playing interface based on the interface placement results, where the bullet-screen comment track design area includes the interface placement results.

Optionally, the bullet-screen comment track design area is a rectangular frame, and correspondingly, the first division module is further configured to:

- divide the bullet-screen comment track design area based on the preset bullet-screen comment track interval to generate a plurality of rectangular units; and
- determine a line segment generated by intersection of a target edge of a target rectangular unit and the interface placement result as a bullet-screen comment track of the video playing interface, where the target rectangular unit is one of the plurality of rectangular units, and the interface placement result includes the line segment.

Optionally, the bullet-screen comment processing apparatus further includes:

- a second processing module, configured to determine at least two corresponding interface placement results when a to-be-played video is played on the video playing interface based on at least two preset playing modes;
- a combination module, configured to combine the at least two interface placement results, and determine a bullet-screen comment track design area of the video playing interface based on a combination result, where the bullet-screen comment track design area includes the combination result; and
- a second division module, configured to divide the bullet-screen comment track design area based on a preset bullet-screen comment track interval, and determine the preset bullet-screen comment tracks of the video playing interface based on a division result.

Optionally, the bullet-screen comment track design area is a rectangular frame: and correspondingly, the second division module is further configured to:

- divide the bullet-screen comment track design area based on the preset bullet-screen comment track interval to generate a plurality of rectangular units; and
- determine a line segment generated by intersection of a target edge of a target rectangular unit and a target interface placement result as a preset bullet-screen comment track of the video playing interface played based on a target preset video playing mode, where the target interface placement result is one of the at least two interface placement results.

Optionally, the interface placement result is a rectangular frame; and correspondingly, the combination module is further configured to:

- establish a two-dimensional coordinate system with any vertex in the combination result as a coordinate origin, and with a length side and a width side of the target interface placement result as a transverse axis and a longitudinal axis respectively, where the target interface placement result is one of the at least two interface placement results; and
- determine vertex coordinates of the bullet-screen comment track design area in the two-dimensional coordinate system based on a length and a width of the target interface placement result, and construct the bullet-screen comment track design area based on the vertex coordinates.

Optionally, the rendering module 406 is further configured to:

- determine a target bullet-screen comment track of the to-be-displayed bullet-screen comment based on the preset bullet-screen comment tracks; and
- render the to-be-displayed bullet-screen comment to the video playing interface based on the bullet-screen comment display effect and position information of the target bullet-screen comment track on the video playing interface.

Optionally, the rendering module 406 is further configured to:

- determine whether idle bullet-screen comment tracks exist in the preset bullet-screen comment tracks; and
- if yes, determine any one of the idle bullet-screen comment tracks as the target bullet-screen comment track of the to-be-displayed bullet-screen comment; or
- if not, determine a target track identifier in a track queue whose adding time meets a preset time threshold, determine occupation values of preset bullet-screen comment tracks corresponding to the target track identifier, and determine a preset bullet-screen comment track whose occupation value is less than a preset occupation threshold as the target bullet-screen comment track of the to-be-displayed bullet-screen comment.

Optionally, the bullet-screen comment processing apparatus further includes:

an adding module, further configured to determine a track identifier of the target bullet-screen comment track, and add the track identifier to a track queue, where the target bullet-screen comment track is converted into a non-idle bullet-screen comment track.

Optionally, the bullet-screen comment processing apparatus further includes a filtering module configured to:
determine whether a ratio of a quantity of track identifiers contained in the track queue to a quantity of preset bullet-screen comment tracks of the video playing interface is greater than a preset ratio threshold; and
if yes, filter, based on adding times of the track identifiers in the track queue, target track identifiers meeting a preset condition, and determine preset bullet-screen comment tracks corresponding to the target track identifiers as idle bullet-screen comment tracks.

Optionally, the bullet-screen comment processing apparatus further includes a detection module configured to:
detect whether a playing mode of the target video on the video playing interface changes: and
if yes, determine a preset bullet-screen comment track that is of the video playing interface during video playing based on the changed playing mode and that is included in the bullet-screen comment track design area.

Optionally, the rendering module 406 is further configured to:
determine a bullet-screen comment display style of the to-be-displayed bullet-screen comment based on the bullet-screen comment display effect, where the bullet-screen comment display style includes bullet-screen comment parameters set based on the bullet-screen comment display effect; and
render the to-be-displayed bullet-screen comment to the video playing interface based on the position information of the target bullet-screen comment track on the video playing interface and the bullet-screen comment display style.

Optionally, the rendering module 406 is further configured to:
determine whether idle bullet-screen comment tracks exist in the preset bullet-screen comment tracks; and
if yes, select the target bullet-screen comment track of the to-be-displayed bullet-screen comment from the idle bullet-screen comment tracks based on a correlation between a video playing terminal and a user terminal sending the to-be-displayed bullet-screen comment.

Optionally, the playing mode includes playing in a landscape mode or playing in a portrait mode.

Optionally, the bullet-screen comment display effect includes an oblique layered display effect.

The above is the schematic solution of the bullet-screen comment processing apparatus of this embodiment. It should be noted that the technical solution of the bullet-screen comment processing apparatus is of the same conception as the technical solution of the above bullet-screen comment processing method. For details not described in detail in the technical solutions of the bullet-screen comment processing apparatus, reference may be made to the description of the technical solution of the above bullet-screen comment processing method.

Figure 5:
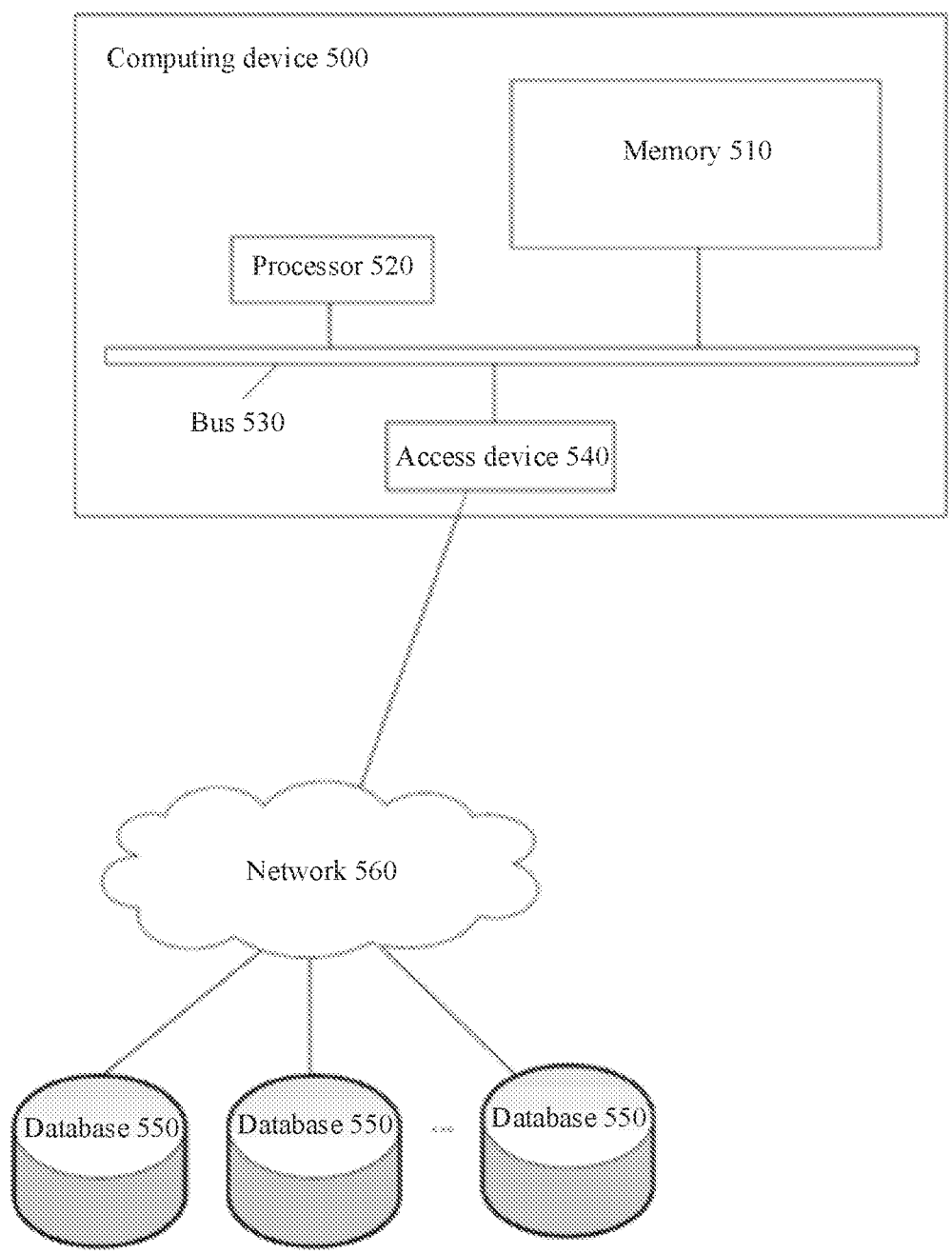
FIG. 5 is a structural block diagram of a computing device according to some embodiments of the present application.

FIG. 5 is a structural block diagram of a computing device 500 according to some embodiments of the present application. Components of the computing device 500 include, but are not limited to, a memory 510 and a processor 520. The processor 520 is connected to the memory 510 by using a bus 530, and a database 550 is used to store data.

The computing device 500 further includes an access device 540, and the access device 540 enables the computing device 500 to communicate by using one or more networks 560. Examples of these networks include a public switched telephone network (PSTN), a local area network (LAN), a wide area network (WAN), a personal area network (PAN), or a combination of communication networks such as the Internet. The access device 540 may include one or more of any type of wired or wireless network interfaces (for example, a network interface card (NIC)), such as an IEEE802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In some embodiments of the present application, the foregoing components of the computing device 500 and other components not shown in FIG. 5 may be connected to each other, such as by using a bus. It should be understood that the structural block diagram of the computing device shown in FIG. 5 is for the purpose of illustration only, and not for limiting the scope of the present application. A person skilled in the art can add or replace other components as required.

The computing device 500 may be any type of stationary or mobile computing device, including a mobile device such as a mobile computer or a mobile computing device (for example, a tablet computer, a personal digital assistant, a laptop computer, a notebook computer, and a netbook), a mobile phone (for example, a smart phone), or a wearable computing device (for example, a smartwatch and smart glasses), or a stationary computing device such as a desktop computer or a PC. The computing device 500 may alternatively be a mobile or stationary server.

The processor 520 is configured to execute computer-executable instructions as follows, the processor is configured to execute the computer-executable instructions, and when the processor executes the computer-executable instructions, the steps of the bullet-screen comment processing method are implemented.

The above is the schematic solution of the computing device of this embodiment. It should be noted that the technical solution of the computing device is of the same conception as the technical solution of the above bullet-screen comment processing method. For details not described in detail in the technical solution of the computing device, reference may be made to the description of the technical solution of the above bullet-screen comment processing method.

Some embodiments of the present application further provide a computer-readable storage medium, where the computer-readable storage medium stores computer-executable instructions, and when the instructions are executed by a processor, the steps of the bullet-screen comment processing method are implemented.

The above is the schematic solution of the computer-readable storage medium of this embodiment. It should be noted that the technical solution of the storage medium is of the same conception as the technical solution of the above bullet-screen comment processing method. For details not described in detail in the technical solution of the storage medium, reference may be made to the description of the technical solution of the above bullet-screen comment processing method.

The following describes the specific embodiments of the present application. Other embodiments are within the scope of the appended claims. In some cases, actions or steps described in the claims may be performed in a sequence different from those in the embodiments and desired results may still be achieved. In addition, processes described in the accompanying drawings do not necessarily require a specific order or a sequential order shown to achieve the desired results. In some implementations, multitasking and parallel processing are also possible or may be advantageous.

The computer instructions includes computer program code, and the computer program code may be in a source code form or an object code form, may be an executable file, may be in some intermediate forms, or the like. The computer-readable storage medium may include, any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be noted that, for brief description, the foregoing method embodiments are represented as a combination of a series of actions. However, a person skilled in the art should be aware that the embodiments of the present application are not limited to the described order of the actions, because according to the embodiments of the present application, some steps may be performed in other orders or simultaneously. In addition, a person skilled in the art should also be aware that the embodiments described in the description are examples, and that the actions and modules involved are not necessarily required for the embodiments of the present application.

In the foregoing embodiments, the descriptions of various embodiments have respective focuses. For a part that is not described in detail in some embodiments, reference may be made to related descriptions in other embodiments.

The foregoing disclosed embodiments of the present application are only intended to help describe the present application. The optional embodiments neither describe all the details in detail, nor limit the present invention only to specific implementations. Obviously, many modifications and changes may be made based on the content of the embodiments of the present application. In the present application, these embodiments are selected and specifically described to better explain the principle and practical application of embodiments of the present application, so that a person skilled in the art can well understand and use the present application. The present application is only limited by the claims and a full scope and equivalents thereof.

What is claimed is:

1. A method, comprising:
    obtaining a to-be-displayed bullet-screen comment of a target video;
    determining preset bullet-screen comment tracks of a video playing interface based on a playing mode of the target video on the video playing interface, wherein the playing mode indicates a size and/or an interface placement direction of the video playing interface and the preset bullet-screen comment tracks are generated based on at least two playing modes; and
    rendering the to-be-displayed bullet-screen comment to the video playing interface based on the preset bullet-screen comment tracks and a bullet-screen comment display effect.

2. The method according to claim 1, further comprising:
    determining a bullet-screen comment track design area of the video playing interface based on a preset playing mode of a to-be-played video on the video playing interface;
    dividing the bullet-screen comment track design area based on a preset bullet-screen comment track interval; and
    determining the preset bullet-screen comment tracks of the video playing interface based on a division result.

3. The method according to claim 1, further comprising:
    determining at least two corresponding interface placement results when a to-be-played video is played on the video playing interface based on at least two preset playing modes;
    combining the at least two interface placement results;
    determining a bullet-screen comment track design area of the video playing interface based on a combination result, wherein the bullet-screen comment track design area comprises the combination result;
    dividing the bullet-screen comment track design area based on a preset bullet-screen comment track interval; and
    determining the preset bullet-screen comment tracks of the video playing interface based on a division result.

4. The method according to claim 3, wherein the bullet-screen comment track design area is a rectangular frame; and
    dividing the bullet-screen comment track design area based on the preset bullet-screen comment track interval, and determining the preset bullet-screen comment tracks of the video playing interface based on the division result comprises:
    dividing the bullet-screen comment track design area based on the preset bullet-screen comment track interval to generate a plurality of rectangular units; and
    determining a line segment generated by intersection of a target edge of a target rectangular unit and a target interface placement result as the preset bullet-screen comment track of the video playing interface played based on a target preset video playing mode, wherein the target interface placement result is one of the at least two interface placement results.

5. The method according to claim 3, wherein the interface placement result is a rectangular frame; and
    determining the bullet-screen comment track design area of the video playing interface based on the combination result comprises:
    establishing a two-dimensional coordinate system with any vertex in the combination result as a coordinate origin and with a length side and a width side of a target interface placement result as a transverse axis and a longitudinal axis respectively, wherein the target interface placement result is one of the at least two interface placement results; and
    determining vertex coordinates of the bullet-screen comment track design area in the two-dimensional coordinate system based on a length and a width of the target interface placement result, and constructing the bullet-screen comment track design area based on the vertex coordinates.

6. The method according to claim 1, wherein rendering the to-be-displayed bullet-screen comment to the video playing interface based on the preset bullet-screen comment tracks and the bullet-screen comment display effect comprises:
  determining a target bullet-screen comment track of the to-be-displayed bullet-screen comment based on the preset bullet-screen comment tracks; and
  rendering the to-be-displayed bullet-screen comment to the video playing interface based on the bullet-screen comment display effect and position information of the target bullet-screen comment track on the video playing interface.

7. The method according to claim 6, wherein determining the target bullet-screen comment track of the to-be-displayed bullet-screen comment based on the preset bullet-screen comment tracks comprises:
  determining whether idle bullet-screen comment tracks exist in the preset bullet-screen comment tracks;
  in response to determining that idle bullet-screen comment tracks exist in the preset bullet-screen comment tracks, determining any one of the idle bullet-screen comment tracks as the target bullet-screen comment track of the to-be-displayed bullet-screen comment; and
  in response to determining that idle bullet-screen comment tracks do not exist in the preset bullet-screen comment tracks:
    determining a target track identifier in a track queue whose adding time meets a preset time threshold;
    determining an occupation value of the preset bullet-screen comment track corresponding to the target track identifier; and
    determining a preset bullet-screen comment track whose occupation value is less than a preset occupation threshold as the target bullet-screen comment track of the to-be-displayed bullet-screen comment.

8. The method according to claim 6, further comprising:
  after determining the target bullet-screen comment track of the to-be-displayed bullet-screen comment based on the preset bullet-screen comment tracks, determining a track identifier of the target bullet-screen comment track, and adding the track identifier to a track queue, wherein the target bullet-screen comment track is converted into a non-idle bullet-screen comment track.

9. The method according to claim 8, further comprising:
  determining whether a ratio of a quantity of the track identifiers included in the track queue to a quantity of the preset bullet-screen comment tracks of the video playing interface is greater than a preset ratio threshold; and
  in response to determining that the ratio of the quantity of the track identifiers included in the track queue to the quantity of the preset bullet-screen comment tracks of the video playing interface is greater than the preset ratio threshold, filtering, based on adding times of the track identifiers in the track queue, target track identifiers meeting a preset condition, and determining the preset bullet-screen comment tracks corresponding to the target track identifiers as idle bullet-screen comment tracks.

10. The method according to claim 2, further comprising:
  detecting whether the playing mode of the target video on the video playing interface changes; and
  in response to determining that the playing mode of the target video on the video playing interface changes, determining the preset bullet-screen comment track of the video playing interface during video playing based on the changed playing mode, wherein the preset bullet-screen comment track is included in the bullet-screen comment track design area.

11. The method according to claim 6, wherein rendering the to-be-displayed bullet-screen comment to the video playing interface based on the bullet-screen comment display effect and the position information of the target bullet-screen comment track on the video playing interface comprises:
  determining a bullet-screen comment display style of the to-be-displayed bullet-screen comment based on the bullet-screen comment display effect, wherein the bullet-screen comment display style comprises bullet-screen comment parameters set based on the bullet-screen comment display effect; and
  rendering the to-be-displayed bullet-screen comment to the video playing interface based on the position information of the target bullet-screen comment track on the video playing interface and the bullet-screen comment display style.

12. The method according to claim 6, wherein determining the target bullet-screen comment track of the to-be-displayed bullet-screen comment based on the preset bullet-screen comment tracks comprises:
  determining whether idle bullet-screen comment tracks exist in the preset bullet-screen comment tracks; and
  in response to determining that idle bullet-screen comment tracks exist in the preset bullet-screen comment tracks, selecting the target bullet-screen comment track of the to-be-displayed bullet-screen comment from the idle bullet-screen comment tracks based on a correlation between a video playing terminal and a user terminal sending the to-be-displayed bullet-screen comment.

13. The method according to claim 1, wherein the playing mode comprises playing in a landscape mode or playing in a portrait mode.

14. The method according to claim 1, wherein the bullet-screen comment display effect comprises an oblique layered display effect.

15. A computer device, comprising:
  a processor; and
  a memory, wherein the memory stores computer instructions executable by the processor that, when executed by the processor, cause the processor to:
    obtain a to-be-displayed bullet-screen comment of a target video;
    determine preset bullet-screen comment tracks of a video playing interface based on a playing mode of the target video on the video playing interface, wherein the playing mode indicates a size and/or an interface placement direction of the video playing interface and the preset bullet-screen comment tracks are generated based on at least two playing modes; and
    render the to-be-displayed bullet-screen comment to the video playing interface based on the preset bullet-screen comment tracks and a bullet-screen comment display effect.

16. The computer device according to claim 15, wherein the computer instructions further cause the processor to:
  determine a bullet-screen comment track design area of the video playing interface based on a preset playing mode of a to-be-played video on the video playing interface;
  divide the bullet-screen comment track design area based on a preset bullet-screen comment track interval; and determine the preset bullet-screen comment tracks of the video playing interface based on a division result.

17. The computer device according to claim 15, wherein the computer instructions further cause the processor to:
    determine at least two corresponding interface placement results when a to-be-played video is played on the video playing interface based on at least two preset playing modes;
    combine the at least two interface placement results;
    determine a bullet-screen comment track design area of the video playing interface based on a combination result, wherein the bullet-screen comment track design area comprises the combination result;
    divide the bullet-screen comment track design area based on a preset bullet-screen comment track interval; and
    determine the preset bullet-screen comment tracks of the video playing interface based on a division result.

18. A non-transitory computer-readable storage medium storing computer instructions that, when executed by a processor, cause the processor to:
    obtain a to-be-displayed bullet-screen comment of a target video;
    determine preset bullet-screen comment tracks of a video playing interface based on a playing mode of the target video on the video playing interface, wherein the playing mode indicates a size and/or an interface placement direction of the video playing interface and the preset bullet-screen comment tracks are generated based on at least two playing modes; and
    render the to-be-displayed bullet-screen comment to the video playing interface based on the preset bullet-screen comment tracks and a bullet-screen comment display effect.

19. The non-transitory computer-readable storage medium according to claim 18, wherein the computer instructions further cause the processor to:
    determine a bullet-screen comment track design area of the video playing interface based on a preset playing mode of a to-be-played video on the video playing interface;
    divide the bullet-screen comment track design area based on a preset bullet-screen comment track interval; and
    determine the preset bullet-screen comment tracks of the video playing interface based on a division result.

20. The non-transitory computer-readable storage medium according to claim 18, wherein the computer instructions further cause the processor to:
    determine at least two corresponding interface placement results when a to-be-played video is played on the video playing interface based on at least two preset playing modes;
    combine the at least two interface placement results;
    determine a bullet-screen comment track design area of the video playing interface based on a combination result, wherein the bullet-screen comment track design area comprises the combination result;
    divide the bullet-screen comment track design area based on a preset bullet-screen comment track interval; and
    determine the preset bullet-screen comment tracks of the video playing interface based on a division result.

* * * * *